United States Patent

[11] 3,542,295

[72] Inventors Erich W. Weigmann and
 Wolf Roesiger, Munich, Germany
[21] Appl. No. 724,538
[22] Filed April 26, 1968
[45] Patented Nov. 24, 1970
[73] Assignee Entwicklungsring Sud GmbH,
 Munich, Germany
[32] Priority April 28, 1967
[33] Germany
[31] No. E33 902

[54] EJECTOR NOZZLE FOR JET ENGINES
 5 Claims, 6 Drawing Figs.
[52] U.S. Cl. .................................................. 239/265.35,
 60/232; 244/56; 181/33.221
[51] Int. Cl. .................................................. B64c 15/04
[50] Field of Search ........................................... 239/265.19,
 265.31, 265.33, 265.35; 60/232; 181/33.221;
 244/12A, 53, 54, 56

[56] References Cited
UNITED STATES PATENTS
3,311,327 3/1967 Greulich ....................... 244/56X
3,416,754 12/1968 Pinaire et al. .................. 60/232X Primary Examiner—M. Henson Wood, Jr.
Assistant Examiner—Michael Y. Mar
Attorney—William K. Serp ABSTRACT: The exhaust jet of the illustrated aircraft propulsion means may be selectively directed in a downward direction to provide the vertical thrust necessary for takeoff and landing of the aircraft. Positioned about the primary exhaust nozzle of the engine is a secondary nozzle which comprises a pair of nested cylindrical segments. A first cylindrical segment is secured to the airframe of the aircraft and defines a longitudinally oriented elongated opening which is downwardly directed to permit passage of the primary nozzle therethrough during vertical flight. A second cylindrical segment similarly defines an elongated opening and is rotatable about its axis with respect to the first cylindrical segment. During vertical flight, the openings are placed in registration, and the primary nozzle is positioned therethrough. During cruise flight, the second cylindrical segment is rotated with respect to the first segment to provide a continuous shield about the primary nozzle.

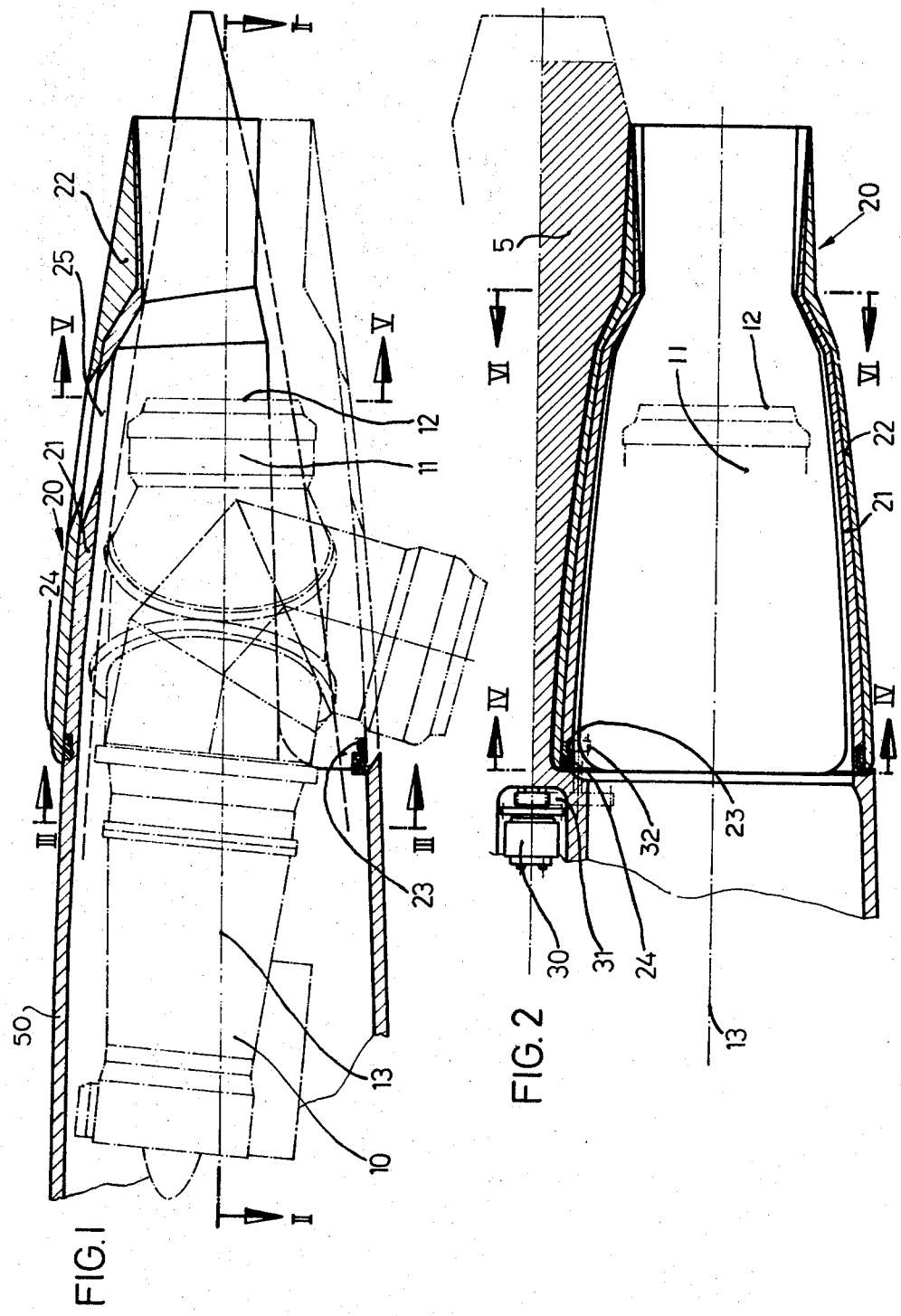

EJECTOR NOZZLE FOR JET ENGINES

BACKGROUND OF THE INVENTION

This invention generally relates to an ejector nozzle and more particularly relates to an ejector nozzle particularly adapted for thrust vectoring the exhaust jet of the engines of vertical takeoff and landing (VTOL) and short takeoff and landing (STOL) aircraft.

Nozzle arrangements adapted to facilitate the fresh air intake of jet engines are relatively well known. With such conventional constructions, flap segments are opened downwardly so as to allow unobstructed vertical thrust vectoring of the engine. Such a configuration, however, adversely influences the aerodynamic performance of the aircraft. In addition, a considerable number of complex subassemblies are required for obtaining the synchronized control of the tilting movement and for mounting the individual flaps to the airframe structure.

Alternate arrangements for jet engine ejector nozzles for fresh air intake are known wherein the ejector nozzle is axially shifted along the jet exhaust pipe. Such configurations have relatively low drag during cruise flight, however, and increase the complexity of the actuating, guiding, and retaining apparatus.

A main feature of the illustrated embodiment is the avoidance of the tilting nozzle segments of known constructions. this feature is obtained by rotating a portion of the secondary nozzle so as to align an elongated opening defined thereby with the lower end of the fuselage to allow the primary nozzle to extend downwardly for vertical thrust vectoring.

Briefly, with reference to the illustrated embodiment, a secondary nozzle consisting of two nested cylindrical sections is positioned about the jet engine primary nozzle which tilts downward during vertical takeoff and landing. The upwardly disposed cylindrical segment is rigidly fixed to the airframe. The lower section, however, is rotatable about the longitudinal axis of the engine. It should be noted that this arrangement eliminates the need for doors, as well as actuating and synchronizing mechanisms for their operation.

The illustrated embodiment provides for the lower cylindrical section to be rotated through 180° with respect to the upper tube section. Further, each of the tubular sections is in a common symmetry plane, and their parallel horizontal axes are vertically offset. The illustrated embodiment includes locking facilities located at the longitudinal edges of each of the sections. The sections are provided with fresh air intake ports located in the exhaust regions of the primary nozzle.

A main object of this invention is to provide an improved ejector nozzle for a jet engine. Other objects and advantages of the invention will become apparent with reference to the following description and accompanying drawings which show an illustrative embodiment of this invention.

BRIEF DESCRIPTION OF THE DRAWINGS

FIG. 1 is a longitudinal cross-sectional view of the propulsion means of an aircraft including certain features of this invention.

FIG. 2 is a cross-sectional view taken along the line II–II of FIG. 1.

DESCRIPTION OF THE PREFERRED EMBODIMENT

Figure 3:
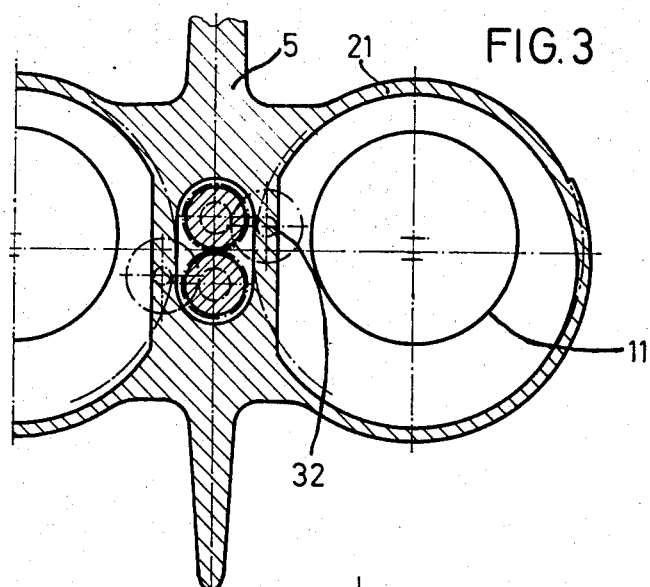
FIG. 3 is a cross-sectional view taken along the line III–III of FIG. 1.

With reference to FIG. 1, a jet engine 10 is illustrated which is installed in the airframe of a VTOL aircraft. A secondary nozzle 20 is positioned about a tiltable primary exhaust nozzle 11 of the engine 10. The secondary exhaust nozzle comprises an outer segment 22 and nested segment 21. The inner segment 21 is an extension of the nozzle body 50, the latter of which is secured to the airframe at a point in front of the segment 21, a space exists between the segment 21 and the airframe which space receives the inner segment 22 which is rotatable through 180° about its longitudinal axis. For illustration purposes the segment 21 will be shown and described as being fixed to the airframe and nonrotatable. It is to be understood, however, that the segment 22 can be fixed, to the air frame with the segment 21 being rotatable to nest within segment 22 or close the opening 40. A motor 30 is rigidly mounted to the airframe and drives a pinion 32 via a transmission 31. The pinion meshes with gear teeth 23 formed about the interior surface of the outer segment 22. Serving to reduce friction between the cylindrical segments during movement is a bearing 24.

In the closed position of the nozzle 20, as illustrated in FIG. 3, the cross section thereof is approximately round, and the two cylindrical segments 21 and 22 are provided with suitable interlocking means at their overlapping longitudinal edges.

Figure 4:
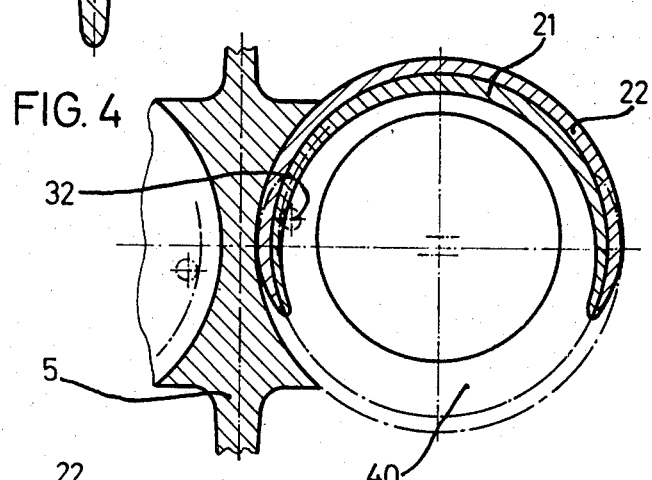
FIG. 4 is a cross-sectional view taken along the line IV–IV of FIG. 2.

During vertical flight, the inner cylindrical segment 22 is rotated about its longitudinal axis 13 so as to place the elongated opening of the sections 21 and 22 in registering alignment, thus producing an opening 40 through which the primary nozzle 11 tilts for vertical thrust operation. In this open position, the outer cylindrical segment 22 rests about the inner cylindrical segment 21, as illustrated in FIG. 4. Thus a downwardly disposed opening is provided for vectoring the primary nozzle therethrough. A feature of the illustrated embodiment is that the aerodynamic conditions of the aircraft remain substantially unchanged regardless of the relative positions of the cylindrical sections 21 and 22.

Figures 5, 6:
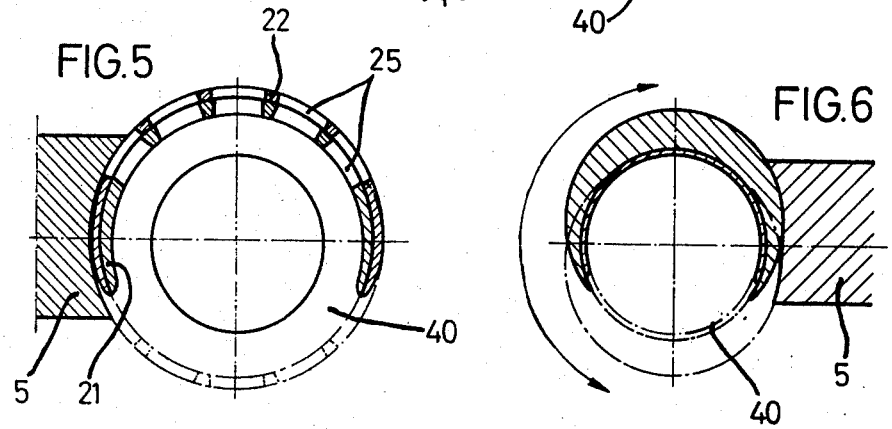
FIG. 5 is a cross-sectional view taken along the line V–V of FIG. 1.
FIG. 6 is a cross-sectional view taken along the line VI–VI of FIG. 2.

In order to obtain the ejector effect of the secondary nozzle, appropriate fresh air intake ports 25 are defined along the periphery of the segments 21 and 22 in the primary nozzle exhaust region, as particularly illustrated in FIG. 5. The primary nozzle exhaust jet produces a reactive force which tends to produce a buckling stress upon the sections 21 and 22. To prevent deformation of the sections, the wall thickness of the critical portions thereof are suitably increased. When compared with prior arrangements, the illustrated embodiment results in a considerable saving in space and maintains favorable aerodynamic flow conditions.

Although but one specific embodiment of this invention has been herein shown and described, it should be understood that certain details of the construction shown may be altered without departing from the spirit and scope of this invention.

We claim:

1. An ejector nozzle suitable for use with a jet engine of jet-propelled aircraft, said ejector nozzle comprising a tiltable primary nozzle for directing the jet stream from the engine, a secondary nozzle including nested cylindrical segments axially rotatable with respect to each other, each of said cylindrical segments defining an elongated axially oriented opening, one of said cylindrical segments being fixed to the airframe of said aircraft, and the other of said segments being rotatable about an axis generally parallel to the longitudinal axis of the engine.

2. An ejector nozzle in accordance with claim 1 wherein each of said cylindrical segments adjacent the exhaust region of the primary nozzle defines fresh air intake ports.

3. An ejector nozzle in accordance with claim 2 wherein the edges of said cylindrical segments defining said elongated openings are provided with interlocking means.

4. An ejector nozzle in accordance with claim 1 wherein said rotatable cylindrical section rotates through a 180° angle.

5. An ejector nozzle in accordance with claim 1 which further includes a motor drivingly engaged with a pinion gear and a plurality of gear teeth formed about the interior surface of said rotatable cylindrical segment, said pinion gear and said gear teeth being in meshing engagement so that actuation of said motor produces rotational movement of said rotatable cylindrical segment with respect to said fixed cylindrical segment.